Nov. 24, 1953 — A. S. VOLPIN — 2,660,191
GATE VALVE
Filed Dec. 20, 1948 — 3 Sheets-Sheet 2
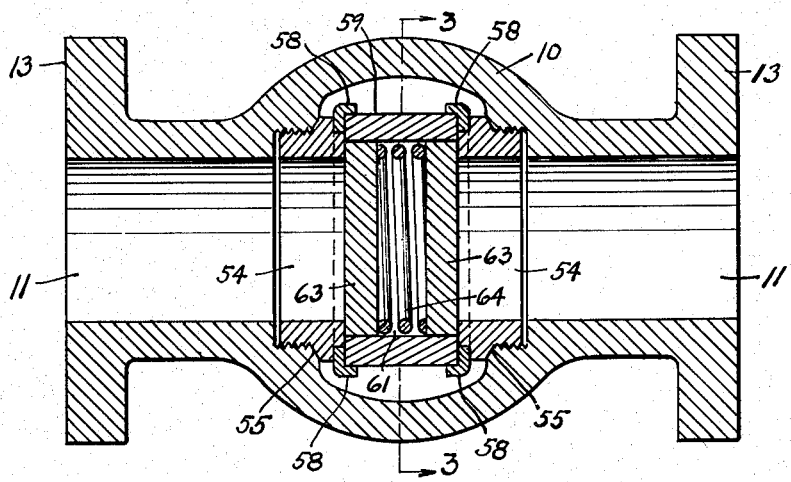
Fig. 2.
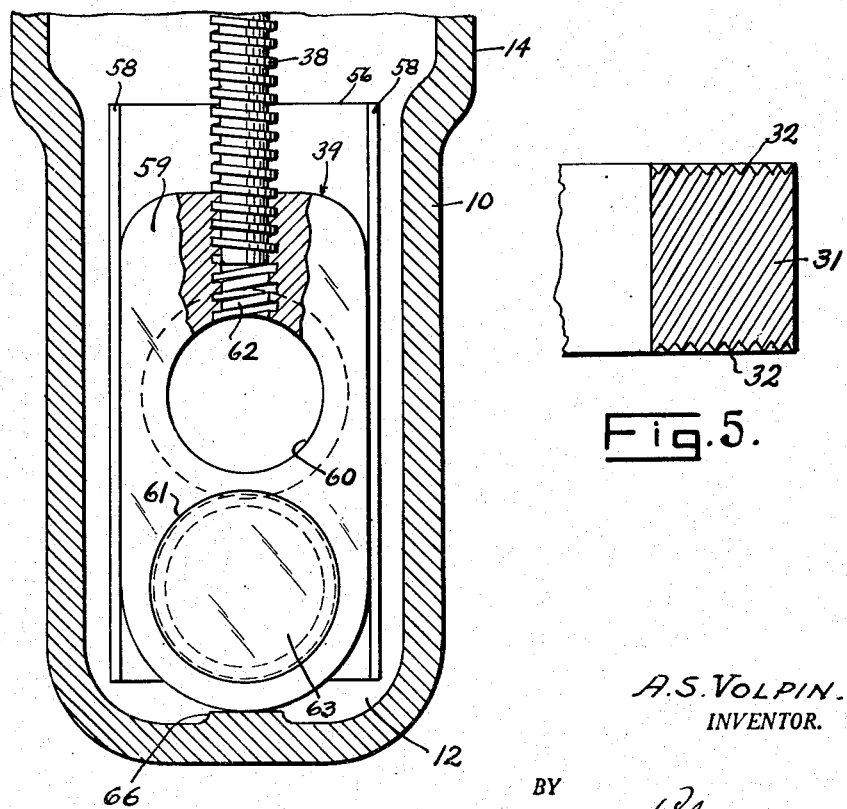
Fig. 3.
Fig. 5.
A. S. VOLPIN.
INVENTOR.
BY
R. Weil
ATTORNEY.

Nov. 24, 1953        A. S. VOLPIN        2,660,191
                     GATE VALVE

Filed Dec. 20, 1948                    3 Sheets-Sheet 3

A.S. VOLPIN.
INVENTOR.

BY

*L. Weil*
ATTORNEY.

Patented Nov. 24, 1953

2,660,191

UNITED STATES PATENT OFFICE 2,660,191

GATE VALVE

Alexander S. Volpin, Houston, Tex.

Application December 20, 1948, Serial No. 66,260

15 Claims. (Cl. 137—315)

1

This invention relates to gate valves particularly of the conduit type which are especially adapted for high pressure service.

This invention is particularly directed to improvements in the type of gate valve which employs a pressure seal bonnet which is insertible through an opening in the valve housing and in which use is made of a seal ring of a diameter greater than the housing entrance to seal between suitably disposed cooperating surfaces of the housing and bonnet in response to pressure exerted from the interior of the valve housing. Conventional designs of such valves employ sealing surfaces which are inclined with respect to the vertical axis of the housing with the result that with increasing pressure exerted against the inner face of the bonnet from within the housing, increased sealing stresses are generated in the tapered surfaces which, because of the taper, will be directed generally radially outwardly in the form of so-called "hoop" stresses. In this type of conventional construction, enormous hoop stresses may develop, particularly in high pressure service and, in the presence of hidden flaws in the housing metal, may rupture the housing. In oil and gas pipe lines, well christmas trees and other high pressure installations conducting highly volatile and inflammable fluids, this may be of serious consequence.

Still another practical problem encountered in valves having bonnet constructions of the type described is that of effectively dislodging the seal ring when it is desired to disassemble the valve. By reason of the tapered surfaces between the bonnet and seal ring, corrosive conditions or the applications of high pressures thereto will frequently cause the seal ring to become very tightly jammed or frozen on the bonnet with the result that its removal becomes a time consuming and exasperating job and, in instances, must be chiseled or otherwise cut off of the bonnet.

In conventional gate valves, the usual construction of the gate element is such that, in the open position, the gate will be at the upper terminal position and must be moved downwardly in order to close the flow passage through the valve housing. When such a gate is in the open position, particularly as when used in a pipe line in which such gate valves are maintained in the open position for long periods of time, sediment frequently accumulates in the lower part of the valve housing in the path of movement of the gate element and interferes with the closing operation. This may be of serious consequence

2 when it becomes imperative that a complete closing be quickly and effectively made.

Accordingly, it is a general object of this invention to provide an improved gate valve construction which will eliminate or obviate the foregoing and other disadvantages of the more conventional valve constructions.

A principal object of this invention is to provide a gate valve construction having improved pressure sealed bonnet and movable gate elements which are adapted to substantially improve the operating efficiency of such valves and to overcome various disadvantages to which existing types of valves are subject.

An important object is the provision of a bonnet seal construction for valves employing a seal ring adapted to be gripped in shear between cooperating surfaces of a valve housing and an inserted bonnet, the engaging surfaces of said ring and said housing and bonnet being generally plane surfaces.

A further object is the provision of a bonnet seal construction for valves employing a seal ring adapted to be gripped in shear between cooperating surfaces of a valve housing and an inserted bonnet, the engaging surfaces of said ring and said housing and bonnet being plane surfaces, and the engaging surfaces of said seal ring having one or more V-shaped concentric grooves thereon to establish a seal.

Another object is the provision in valves of the pressure sealed bonnet construction of bumper bosses in the valve housing cooperable with the bonnet seal ring to aid in its removal from the bonnet.

An additional object is the provision of a valve gate construction which is adapted to move upwardly in a valve in moving from the open to the closed position.

Still another object is to provide a one-piece reciprocable valve gate element having a fluid conduit in its upper portion and a closure element in its lower portion.

A further object is the provision of a gate valve of the non-rising stem type having a gate element provided with upper and lower apertures, the upper aperture being adapted, when said gate element is in its lower terminal position, to register with the fluid passages through the valve, and the lower aperture carrying spring-loaded closure disks and being adapted, when said gate element is in its upper terminal position, to form a closure for said fluid passages.

Various other objects and advantages of this invention will become apparent from the following detailed description when read in conjunction with the accompanying drawings in which:

Fig. 2 is a sectional plan view along line 2—2 of Fig. 1;

Fig. 3 is a partial sectional end view along line 3—3 of Fig. 2 showing particularly a side elevational view of the gate element in open position;

Fig. 4 is a cross-sectional view along line 4—4 of Fig. 1;

Fig. 5 is an enlarged sectional view of a portion of the bonnet seal ring;

Figure 1:
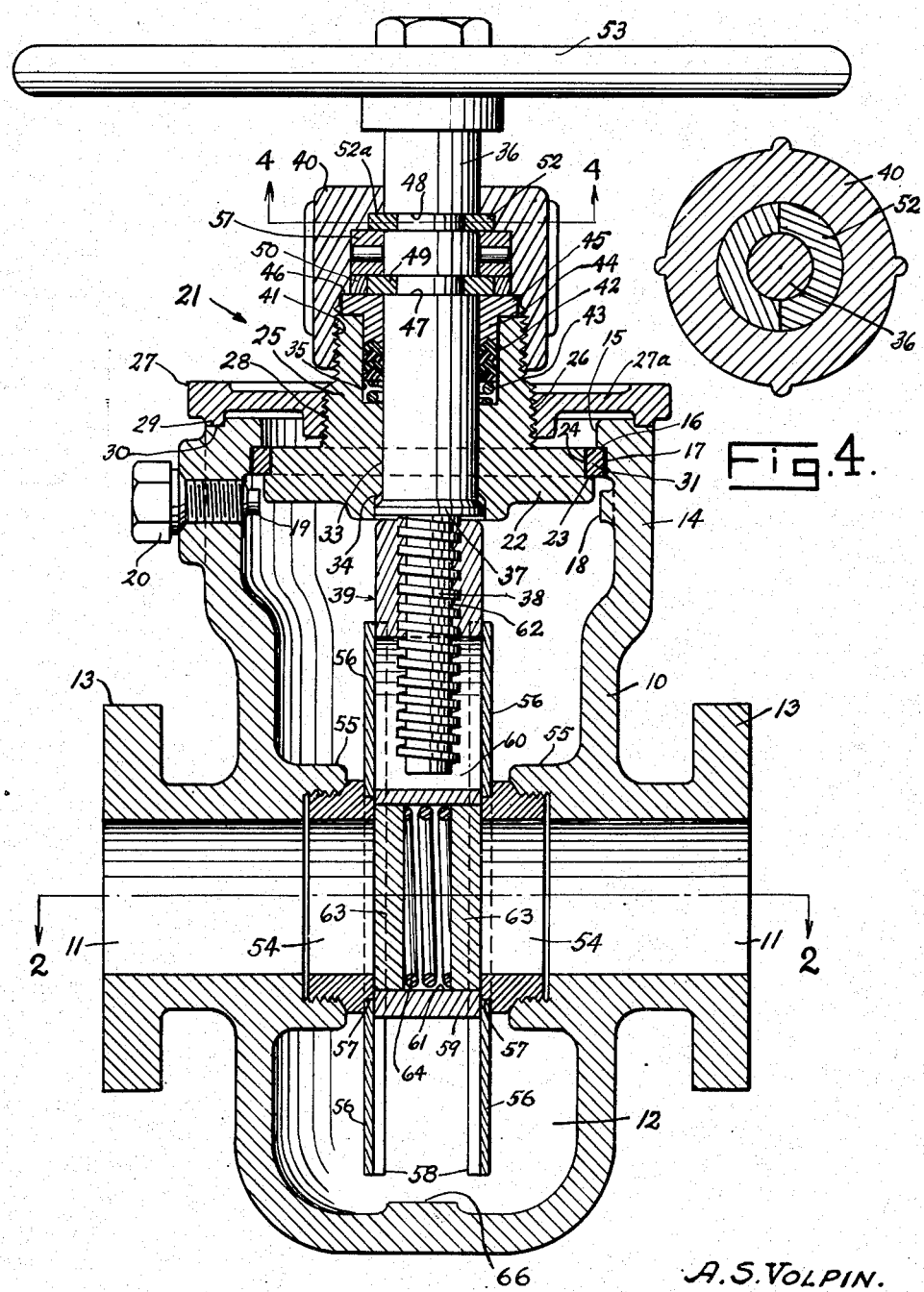
Fig. 1 is a sectional side view of a valve in accordance with one embodiment of this invention.

Referring to the drawings, a valve body or housing 10 is provided with a transverse fluid passageway 11 and a central chamber 12 extending below passageway 11 and forming a closure for the lower end of housing 10. The opposite outer ends of passageway 11 are provided with the usual bolt flanges 13 for connecting the valve into a conduit to be controlled thereby. Housing 10 is provided at its upper end with an open-ended generally tubular portion 14 of somewhat larger diameter than the lower portion of the housing. The upper end of portion 14 is provided with an inwardly extending annular lip 15 which is undercut to form a downwardly facing plane-surfaced shoulder 16 and a concentric cylindrical surface 17 extending downwardly therefrom. Spaced somewhat below shoulder 16 and the lower end of surface 17 is a short boss 18 which extends from the wall of portion 14 inwardly of the housing to a point intermediate surface 17 and the inner edge of shoulder 16. A second boss 19 is mounted on the inner end of a threaded stud 20 which extends through the wall of portion 14 from the exterior thereof at a point generally opposite boss 18 and below shoulder 16. By means of the described arrangement boss 19 may be advanced or retracted with respect to the inner wall of portion 14 by appropriate rotation of stud 20. It will be understood that both bosses 18 and 19 may be made adjustable and that more than two such bosses may be employed for purposes to be described in greater detail hereinafter.

The upper end of housing 10 is closed by means of a bonnet, designated generally by the numeral 21, which includes a horizontally disposed closure member 22 having a peripheral shape generally concentric with the opening in the valve housing and having an external diameter slightly less than the internal diameter of lip 15, providing an annular space therebetween to permit free passage of member 22 through the bore of lip 15. The edge of member 22 is reduced in diameter about its upper portion to form an upwardly facing annular shoulder 23 machined to form a plane surface and an upwardly extending concentric cylindrical surface 24. Extending upwardly from the center of member 22 and preferably integral therewith is a tubular boss 25 which is externally threaded at 26 about its lower portion and adapted to be screwed into a generally circular cover or clamping plate 27, having an internally threaded axial aperture 28 adapted to receive boss 25. Cover plate 27 is adapted to extend over the upper end of the housing and is provided on its lower face with a depending circular tongue 29 adapted to seat in a matching groove 30 cut in the upper end of portion 14.

A sealing ring 31 of generally rectangular cross section is mounted about the periphery of member 22 and is seated on shoulder 23. Ring 31 is preferably constructed of metal possessing a sufficient degree of resilience such that it may be appreciably deformed without breaking, and is made with an external diameter somewhat greater than the diameter of the bore of lip 15 and somewhat less than the diameter of cylindrical surface 17 so that when in place, as illustrated, there will be a small amount of clearance between the outer periphery of the ring and surface 17. The internal diameter of ring 31 will be made such as to provide a snug fit about cylindrical surface 24. As so dimensioned the ring will be of a thickness to span the annular space between the adjacent peripheral edges of shoulders 16 and 23 and the lower end of ring 31 will, therefore, overhand the outer edges of shoulder 23. The upper and lower end faces of ring 31 are generally plane and may be provided with a plurality of concentrical V-shaped grooves to thereby form a plurality of concentric teeth 32. (See Fig. 5.) When sealing ring 31, having the described construction and dimensions, is installed on the bonnet in a manner to be described hereinafter, and cover plate 27 is screwed on boss 25, member 22 will be drawn upwardly toward lip 15 and ring 31 is adapted to be gripped between shoulders 16 and 23 and to be held in axial shear between these elements under pressure exerted upwardly against member 22. Teeth 32 are adapted to bite into the opposed surfaces of shoulders 16 and 23 and thus assure an effective seal between these elements. The term "plane surfaces" as used herein is intended to mean surfaces which are generally normal to the vertical axis of housing 10 and member 22.

Cover plate 27 is provided intermediate its inner and outer peripheries with a section 27a of reduced thickness which is adapted to impart a degree of flexibility to the plate permitting it to flex in response to variations in pressure on the closure elements to thereby continually maintain the parts of the seal in their operable relation.

Member 22 and boss 25 are provided with an axial bore 33 the lower end of which is slightly enlarged to form an annular shoulder 34. The upper portion of bore 33 is also enlarged to form a stuffing box 35. A cylindrical valve stem 36 extends through bore 33 and is provided at its lower end with a flange 37 adapted to engage shoulder 34. Stem 36 has a threaded section 38 extending from its lower end and threadedly inserted into the upper end of a gate element, designated generally by the numeral 39. The upper end of stem 36 extends through stuffing box 35 and a cap 40 which is adapted to screw down over external threads 41 carried on the upper end of boss 25. Conventional lip seal packing 42 is disposed in stuffing box 35 about stem 36 and is supported on a coil spring 43 seated in the bottom of the stuffing box. A tubular packing gland 44 surrounds stem 36 and extends into stuffing box 35 into compressive relationship with packing 42. Gland 44 is provided with an outwardly extending flange 45 adapted to engage the upper end of boss 25 and to be forced downwardly thereagainst by an internal shoulder 46 formed in cap 40. Stem 36 is provided with a pair of axially spaced grooves 47—48 which are adapted to be enclosed by cap 40. A split ring 49 is installed in groove 47 and extends therefrom over the upper end of gland 44 and is enclosed by a filler ring 50 to fill the space between the outer periphery of ring 49 and the adjacent portion of the inner wall of cap 40. An anti-friction bearing 51, of the roller or other conventional type, is mounted about stem 36 between grooves 47 and 48 and a second split ring 52 is disposed in groove 48 between the upper end of bearing 50 and a shoulder 52a in cap 40. A conventional handwheel 53 is mounted on the upper end of stem 36.

A pair of tubular seat members 54—54 of generally conventional form are removably mounted in seat bosses 55—55 oppositely disposed interiorly of housing 10 in co-axial alignment with fluid passageway 11. A pair of spaced apart parallel guide plates 56—56 are vertically disposed in housing 10 extending transversely of fluid passageway 11 and are provided intermediate their ends with registering perforations 57—57 through which the inner ends of seat members 54 extend so that the inner faces of the seat members are flush with the inner faces of their associated guide plates. The latter serve to confine and guide gate element 39 in its vertical sliding movement between its upper and lower terminal positions and are provided with inwardly turned end flanges 58 which confine gate element 39 against any transverse movement.

Gate element 39 comprises a flat generally rectangular body 59 rounded at its lower end and at its upper corners and dimensioned to a snug sliding fit within the confines of guide plates 56 and edge flanges 58. Vertically spaced upper and lower apertures 60 and 61, respectively, extend transversely through body 59. An internally threaded passage 62 extends from the upper end of body 59 into communication with upper aperture 60 and is adapted to receive threaded stem section 38 which may move into and out of aperture 60 in response to appropriate relative vertical movement between the stem and body 59. A pair of closure disks 63—63 are mounted in the opposite ends of lower aperture 61 and are urged apart by means of a coil spring 64 disposed in compression between the closure disks. The latter are of somewhat larger diameter than that of the bores of seat members 54 and when moved into co-axial alignment therewith serve, in the conventional manner, to close fluid passageway 11. It will be understood that guide plates 56 act as retainers for confining the closure disks in aperture 61 during travel of the gate element. An upwardly extending terminal boss or abutment 66 is provided in the bottom wall of chamber 12, generally in axial alignment with lower end of gate element 39, and is adapted to form a limiting stop for the gate element to assure proper registration of aperture 60 with fluid passageway 11 when the gate element is moved to the open position. The provision of a lower terminal stop, such as abutment 66 serves another important function in connection with the sealing of the bonnet which will be described in greater detail hereinafter.

Figure 6:
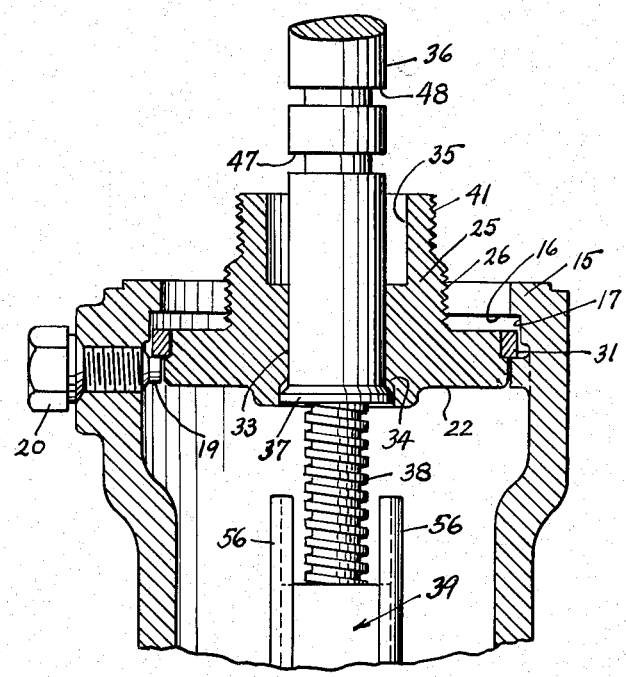
Fig. 6 is a partial sectional side view showing the parts of the bonnet seal structure in the position for effecting removal of the seal ring.

Fig. 6 illustrates the manner in which sealing ring 31 may be effectively and easily removed from the bonnet when necessary to replace it or in dis-assembling the valve for repair or replacement of other parts. It will be seen that the bonnet structure and particularly member 22 cannot be withdrawn from the housing while ring 31 is in place, since the external diameter of ring 31 is greater than that of the bore of lip 15. Ring 31 must, therefore, first be removed to allow member 22 and its connected parts to be removed from the housing. Due to high pressure and corrosive conditions to which the valve may be subjected in operation, ring 31 may become "frozen" to its seat on member 22. In such a case the removal operation is conducted as follows: With gate element 39 drawn upwardly, handle 53, cap 40, stem parts, and cover plate 27 will be removed, thereby freeing member 22 and its attached parts for downward movement in the housing. Boss 19 will be advanced to a position beneath the lower edge of ring 31, as illustrated in Fig. 6. Boss 18 will, of course, be permanently disposed in similar position under the opposite side of the ring. These bosses will thus be disposed in the path of downward movement of the ring and will act as stops or abutments therefor. Thereupon, member 22 will be moved downwardly in any suitable manner to cause the lower edge of ring 31 to lodge on bosses 18 and 19. Further downward pressure on member 22 will cause bosses 18 and 19 to force ring 31 upwardly from its position about the edge of member 22. Where the ring is stuck tightly, it will only be necessary to strike the upper end of boss 25 one or two sharp blows with a suitable tool to dislodge the ring completely from the member. Boss 19 may then be retracted and ring 31, which will generally possess sufficient natural resilience, may be compressed to deform it sufficiently to pass it through the bore of lip 15 at an angle in the manner illustrated in Fig. 7, whereupon, member 22, stem 36 and gate element 39 may be withdrawn from the valve housing and access provided to the guides and seats inside the valve housing.

Figure 7:
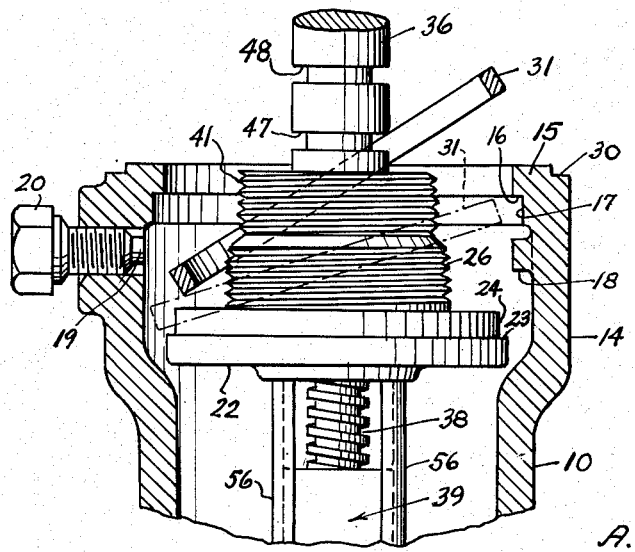
Fig. 7 is a view similar to Fig. 6 illustrating the manner of application of the seal ring to the bonnet structure.

The valve may be assembled by generally reversing the above-described operations, and Fig. 7 also illustrates the manner in which ring 31 may be installed. As illustrated, member 22 will be lowered into housing 10 to a point well below bosses 18 and 19, the latter being retracted into the wall of portion 14. Ring 31 will then be placed over stem 36 and boss 25, deformed and inserted at an angle through the upper end of the housing until it is below lip 15, after which it is allowed to assume its normal circular shape and is dropped over the edge of member 22 into position on shoulder 23. Thereupon, cover plate 27 will be placed over stem 36 and boss 25 will be pulled up sufficiently to allow cover plate 27 to be screwed down about boss 25, thereby drawing member 22 upwardly and clamping the seal ring 31 between shoulders 16 and 23 to effect a fluid-tight seal between the bonnet structure and valve housing.

With a valve constructed as above described, any pressure internally of the valve housing will be exerted against the lower face of member 22 and will increase the sealing pressure on ring 31. However, due to the described construction, the stresses will be applied to ring 31 in vertical shear and substantially no outward or "hoop" stresses will be exerted on the valve housing thereby providing a greatly increased factor of safety in high pressure service.

It will be evident that the pressure-sealed construction above described may be readily adapted for use as pressure sealed closure for various types of vessel openings in addition to the described use as a bonnet seal for valves.

Since the valve, in accordance with the above-described illustrative embodiment is of the nonrising-stem construction, it will be seen that gate element 39 will move upwardly and downwardly relative to the stem in response to appropriate rotation thereof. However, contrary to conventional design practice, in the present valve, gate element 39 will be moved downwardly to open the valve and upwardly to close the valve. This is a feature of particular importance where the valve is used in services requiring the valve to remain in the open position for long periods of time. Since the gate element is in the down position when the valve is open, any accumulation of sediment in the lower portion of the valve housing, such as chamber 12, cannot interfere with the upward movement of the gate element in closing the valve, and assurance is thus provided for effective closure under such conditions. Also the connection of stem passage 62 with aperture 60 allows the stem to move into the latter when the gate element moves upwardly to the closed position.

When gate element 39 is moved to the open position, its lower end will come in contact with and bear on abutment 66, as previously noted. With the valve thus opened, pressure of the fluid flowing through the valve will, of course, be exerted outwardly on the sealing elements of the described bonnet structure. Should there be any tendency of such fluid to leak out of the valve through the bonnet sealing elements, it will only be necessary for the operator to apply additional rotative force to stem 36 in the direction tending to move gate element 39 downwardly. Since the latter is already bearing on abutment 66, the resulting downward pressure will react through gate element 39, stem 36, and the thrust elements arranged between the stem and the bonnet elements, and will produce a resultant upward pressure on closure member 22 tending to tighten the sealing force exerted thereby on sealing ring 31. By this cooperative arrangement of the gate parts, the housing, and the sealing elements, the bonnet seal may be additionally tightened as required in a very simple and effective manner when the valve is in the open position.

It will be evident that numerous changes and alterations may be made in the details of the illustrative embodiment within the scope of the appended claims but without departing from the spirit of this invention.

What I claim and desire to secure by Letters Patent is:

1. A closure for an opening in a pressure vessel, comprising, a closure member concentric with said opening insertible into said vessel through said opening into axially spaced relation thereto, said closure member being of smaller diameter than said opening to provide an annular space between their peripheral edges, the closure member and the opening having axially spaced laterally extending marginal sealing surfaces facing each other, a seal ring having upper and lower plane faces insertible through said opening and between said surfaces, the cross sectional dimension of said ring being such as to extend across said annular space between said surfaces whereby to be gripped in axial shear between said surfaces when the latter are urged axially toward each other, and means connected to the closure member for urging the parts of said closure member toward said opening.

2. A closure for an opening in a pressure vessel, comprising, a closure member concentric with said opening insertible into said vessel through said opening into axially spaced relation thereto, said closure member being of smaller diameter than said opening to provide an annular space between their peripheral edges, said edges having axially spaced confronting plane sealing surfaces, a seal ring having upper and lower horizontal plane faces insertible through said opening and between said surfaces and dimensioned to extend across said annular space and between said surfaces whereby to be gripped in axial shear between said surfaces when the closure member is urged axially toward said opening, and means connected to the closure member for urging the parts of said closure member toward said opening.

3. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said closure member and said lip having axially spaced laterally extending marginal sealing surfaces facing each other, a seal ring insertible through said opening and between said edges dimensioned to extend across said annular space and between said surfaces, said ring having upper and lower horizontal plane faces adapted to be gripped in axial shear between said surfaces when the closure member is urged toward said lip, and means connected to the closure member for urging the parts of said closure member toward said lip.

4. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said edges having axially spaced confronting horizontal plane sealing surfaces, a seal ring insertible through said opening and between said surfaces and dimensioned to extend across said annular space and between said surfaces, said ring having upper and lower horizontal plane faces adapted to be gripped in axial shear between said surfaces when said closure member is urged axially toward said lip, and means connected to said closure member for urging the parts of said closure member toward said lip.

5. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said edges having axially spaced confronting horizontal plane sealing surfaces, a seal ring insertible through said opening and between said surfaces and dimensioned to extend across said annular space and between said surfaces, said ring having upper and lower horizontal plane faces adapted to be gripped in axial shear between said surfaces when said closure member is moved axially toward said lip, a plurality of V-shaped concentric grooves in said end faces, and means connected to the closure member for urging the parts of said closure member toward said lip.

6. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said edges having axially spaced laterally extending marginal sealing surfaces facing each other, a seal ring insertible through said opening and between said surfaces and dimensioned to extend across said annular space and between said surfaces, said ring having upper and lower horizontal plane faces adapted to be gripped in axial shear between said surfaces when said closure member is urged axially toward said lip, means connected to said closure member for urging the parts of said closure member toward said lip, and one or more ring-dislodging abutment members carried by said housing and extending inwardly thereof into the path of movement of said ring downwardly in said housing.

7. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said edges having axially spaced laterally extending marginal sealing surfaces facing each other, a seal ring insertible through said opening and between said surfaces and dimensioned to extend across said annular space and between said surfaces, said ring having upper and lower horizontal plane faces adapted to be gripped in axial shear between said surfaces when said closure member is urged axially toward said lip, means for maintaining the parts of said closure in operable relation to said lip, and one or more ring-dislodging abutment members carried by said housing and extending inwardly thereof below said ring, at least one of said abutment members being radially adjustable relative to said housing.

8. A closure for the bonnet opening of a valve housing, comprising, an inwardly extending peripheral lip about said opening, a closure member concentric with said lip insertible into said housing through said opening into axially spaced relation to said lip, said closure member being of smaller diameter than said lip to provide an annular space between their peripheral edges, said edges having axially spaced laterally extending marginal sealing surfaces facing each other, a seal ring insertible through said opening and between said surfaces and dimensioned to extend across said annular space and between said surfaces, said ring having upper and lower horizontal plane faces adapted to be gripped in axial shear between said surfaces when said closure member is urged toward said lip, and means for urging the parts of said closure member toward said opening, said means including a clamping plate supported on said housing and spanning said opening and connected to said closure member, said plate having an intermediate section of reduced thickness to impart a degree of flexibility thereto.

9. In a gate valve including a housing having a flow passage therethrough, the combination with a bonnet member insertible into said housing through an opening therein, of a sealing element disposed between said bonnet member and said housing and compressible therebetween by outward pressure of said bonnet member, a stem journalled in said bonnet member, a gate element movable by said stem across said flow passage into abutting relation with said housing when in its lower terminal position, a flow aperture through said gate element registering with said flow passage when said gate element is in said lower terminal position, and co-acting thrust members arranged between said stem and bonnet member axially engageable in response to increase in downward pressure of said gate element against said housing when in said lower terminal position to exert a resultant oppositely directed force on said bonnet member to thereby increase said outward pressure thereof on said sealing element.

10. A closure for an opening in a pressure vessel, comprising, an inwardly extending peripheral lip about said opening and having an annular downwardly facing horizontal plane surface adjacent its peripheral edge, a closure member concentric with said lip insertible into said vessel through said opening into axially spaced relation to said lip, said closure member being of smaller diameter than said lip to provide an annular space between their peripheral edges, said closure member having an upwardly facing horizontal plane surface adjacent its peripheral edge, a metallic seal ring insertible through said opening between said surfaces, said ring being of generally rectangular body section having a radial thickness dimensioned to span said annular space, the upper and lower end faces of said ring being adapted to be gripped in axial shear between said surfaces, and means for maintaining the parts of said closure member in operable relation to said lip.

11. A closure according to claim 10 wherein said last-mentioned means includes a boss extending from said closure member through said opening to the exterior of said vessel, a clamping plate threadedly connected to said boss spanning said opening and bearing against the exterior of said vessel about the opening, said plate having a section of reduced thickness intermediate its outer edge and said boss to impart a degree of flexibility thereto.

12. A closure for an opening in a pressure vessel, comprising, an inwardly extending peripheral lip about said opening having an annular downwardly facing horizontal plane surface adjacent its peripheral edge and a downwardly extending cylindrical portion of larger internal diameter than said peripheral edge, a closure member concentric with said lip insertible into said vessel through said opening into axially spaced relation to said lip, said closure member being of smaller diameter than said lip to provide an annular space between their peripheral edges, said closure member having an upwardly facing horizontal plane surface adjacent its peripheral edge and an upwardly extending cylindrical portion of smaller external diameter than said closure member, a metallic seal ring insertible through said opening between said surfaces, said ring being of generally rectangular body section having a radial thickness dimensioned to span said annular space, said ring having an inner diameter such as to provide a close sliding fit about said upwardly extending cylindrical portion of the closure member and having an outer diameter appreciably less than said internal diameter of said downwardly extending cylindrical portion of the lip, the upper and lower end faces of said ring being adapted to be gripped in axial shear between said surfaces, and means for maintaining the parts of said closure member in operable relation to said lip.

13. A closure for an opening in a pressure vessel, comprising, a closure member insertible into said vessel through said opening, a sealing ring disposed between axially and annularly spaced concentric sealing surfaces on said closure member and said vessel and compressible therebetween by outward pressure of said closure member, the contacting faces of said ring and said surfaces being provided with one or more annular projections, and means connected to the closure member for urging the parts of said closure member toward said opening.

14. A closure for an opening in a pressure vessel, comprising, a closure member insertible into said vessel through said opening, a sealing ring disposed between axially and annularly spaced concentric sealing surfaces on said closure member and the vessel and compressible therebetween by outward pressure of said closure member, one or more ring-dislodging abutment members carried by the wall of said vessel and extending inwardly thereof below said ring, and means connected to the closure member for urging the parts of said closure member toward said opening.

15. A closure for an opening in a pressure vessel, comprising, a closure member insertible into said vessel through said opening, a sealing ring disposed between axially and annularly spaced concentric sealing surfaces on said closure member and said vessel and compressible therebetween by outward pressure of said closure member, the faces of said ring in contact with said surfaces being provided with a plurality of spaced apart concentric annular projections, and means connected to the closure member for urging the parts of said closure member toward said opening.

ALEXANDER S. VOLPIN.

References Cited in the file of this patent

UNITED STATES PATENTS

| Number | Name | Date |
|---|---|---|
| 579,114 | Libbey | Mar. 16, 1897 |
| 1,049,450 | Caskey | Jan. 7, 1913 |
| 1,149,892 | Blattner | Aug. 10, 1915 |
| 1,836,374 | Kelly | Dec. 15, 1931 |
| 2,230,600 | Olson | Feb. 4, 1941 |
| 2,321,597 | Hobbs | June 15, 1943 |
| 2,424,449 | Gasche | July 22, 1947 |
| 2,426,392 | Fennema | Aug. 26, 1947 |
| 2,428,963 | Fennema | Oct. 14, 1947 |